(12) United States Patent
Chou et al.

(10) Patent No.: US 10,929,320 B1
(45) Date of Patent: Feb. 23, 2021

(54) CONTROL CIRCUIT FOR DYNAMIC BIFURCATION CONTROL

(71) Applicant: Quanta Computer Inc., Taoyuan (TW)

(72) Inventors: Le-Sheng Chou, Taoyuan (TW); Sz-Chin Shih, Taoyuan (TW); Shuen-Hung Wang, Taoyuan (TW); Jui-Chi Huang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/706,330

(22) Filed: Dec. 6, 2019

(51) Int. Cl.
*G06F 13/20* (2006.01)

(52) U.S. Cl.
CPC ...... *G06F 13/20* (2013.01); *G06F 2213/0026* (2013.01); *G06F 2213/40* (2013.01)

(58) Field of Classification Search
CPC ......... G06F 13/20; G06F 13/14; G06F 13/409
See application file for complete search history.

(56) References Cited

U.S. PATENT DOCUMENTS

| | | | | |
|---|---|---|---|---|
| 10,346,187 B1* | 7/2019 | Trier | | G06F 9/455 |
| 10,445,279 B1* | 10/2019 | Itkin | | G06F 9/44505 |
| 2012/0260015 A1* | 10/2012 | Gay | | G06F 13/409 |
| | | | | 710/301 |
| 2013/0173952 A1* | 7/2013 | Gao | | G06F 9/4406 |
| | | | | 714/3 |
| 2016/0170918 A1* | 6/2016 | Butcher | | H04L 41/0654 |
| | | | | 710/307 |
| 2017/0090949 A1* | 3/2017 | Arms | | G06F 9/4403 |
| 2017/0262396 A1* | 9/2017 | Mundt | | G06F 13/4068 |
| 2018/0341497 A1* | 11/2018 | Perez Guevara | | G06F 21/575 |
| 2019/0095377 A1* | 3/2019 | Brown | | G06F 13/4286 |
| 2019/0220428 A1* | 7/2019 | Beckett | | G06F 9/00 |

* cited by examiner

*Primary Examiner* — Tim T Vo
*Assistant Examiner* — Phong H Dang
(74) *Attorney, Agent, or Firm* — Nixon Peabody LLP

(57) ABSTRACT

A system and method for generating a control bifurcation signal in accordance with the Open Compute Project (OCP) Specification. An OCP device is provided that has a bifurcation function with an input to activate a bus bifurcation function. An input/output control circuit having an output coupled to a bifurcation control line coupled to the OCP device is provided. The input/output control circuit is operable to provide a bifurcation control signal to the OCP device over the bifurcation control line during an auxiliary power phase transition period of powering-on the OCP device.

20 Claims, 8 Drawing Sheets

CONTROL CIRCUIT FOR DYNAMIC BIFURCATION CONTROL

TECHNICAL FIELD

The present disclosure relates generally to dynamic bifurcation control for OCP devices in computing systems. More particularly, aspects of this disclosure relate to a method to ensure efficient bifurcation control of an OCP device without relying on an external controller during power-on.

BACKGROUND

The Open Compute Project (OCP) has set new standards for devices that may be used in open and energy efficient servers. The Open Compute-based technologies are designed to be as scalable and efficient as possible. The Open Compute Project (OCP) has issued a number of specifications for computing devices such as OCP cards that allow for bifurcation of a PCIe bus. For example, OCP 3.0 devices may include buses with signal lines that may be split into smaller busses via a bifurcation signal. Currently, the bifurcation control signal should be sent by either a baseboard management controller (BMC) or a platform controller hub (PCH) according to the OCP 3.0 Specification.

Thus, the bifurcation control signal allows splitting a bus, such as a PCI Express bus into smaller buses, for OCP devices. For example, a 16-lane PCIe Gen 3 bus on the OCP device may be split into a 2×8-lane PCIe Gen3 interface through a bifurcation signal to the OCP device. Servers supporting PCIe bifurcation have a BIOS setting for enabling the feature. The OCP Specification recommends activating the bifurcation signal via a controller such as the BMC or PCH, and sending a bifurcation control signal during the power on of the system. This feature allows flexibility in bus use and therefore increases the utility of OCP devices.

Unfortunately, the recommendation to use either a BMC or PCH for the bifurcation control signal leads to timing issues when an OCP device is powered-up. The OCP 3.0 Specification includes an auxiliary power mode transition to an auxiliary power mode during the power-on sequence. After the auxiliary power mode, a main power mode transition is made to the main power mode. However, the general purpose input/output (GPIO) pins for bifurcation control signals from a PCH are only ready in the main power mode. Thus, signals from the PCH GPIO pins cannot meet the timing requirements of an OCP 3.0 device because the OCP specification requires completion of the bifurcation setting during the auxiliary power mode transition. Based on this issue, an OCP 3.0 device will require one more power cycle until the GPIO pins of the PCH are ready for transmitting bifurcation control signals. This design will therefore cause the brief loss of the signal from the BMC management port to the OCP device.

The BMC GPIO pins for bifurcation control allow for control of the bifurcation setting of the OCP device during the auxiliary power mode transition to the auxiliary power mode. However, the BMC will take 5-10 minutes for a firmware boot in a normal case, thus leading to timing sequence issues while waiting for the firmware boot. There are also certain operational limitations from following the recommendations of the OCP specification in relation to the bifurcation control signal.

One solution for the timing issues created by the current OCP bifurcation requirements is for a complex programing logic device (CPLD) to hold the power-on sequence by delaying the enable power signal to the OCP device until the BMC firmware boot routine has been completed. Thus, the BMC is ready to send the bifurcation control signals. Unfortunately, such a solution changes the power-on sequence design for the BMC firmware boot and takes too much time for a computer system with the OCP 3.0 device to boot as a normal system.

Thus, there is a need for a circuit that transmits a bifurcation control signal to an OCP 3.0 device without relying on a BMC or a PCH. There is another need for a circuit that allows an OCP 3.0 device to allow bifurcation control in a single power on cycle. There is another need for a circuit that initiates the bifurcation control signal during the auxiliary power transition period.

SUMMARY

One disclosed example is a system for generating a bifurcation control signal in accordance with a device with bus bifurcation functionality. One such example is a device according to the Open Computing Project (OCP) Specification. The system includes a device having a bus bifurcation function with an input to activate the bus bifurcation function. An input/output control circuit has an output coupled to a bifurcation control line coupled to the device. The input/output control circuit is operable to provide a bifurcation control signal to the device over the bifurcation control line during an auxiliary power phase transition period of powering on the device.

In another implementations of the disclosed example system, the system includes a baseboard management controller and a bus coupling the baseboard management controller to the input/output control circuit. The baseboard management controller is operable to update the bifurcation control signal provided by the input/output control circuit after the auxiliary power phase transition period. In another implementation, the system includes a platform controller hub having an input coupled to the bifurcation control line. In another implementation, the device is selected from the group consisting of a network interface card (NIC), a smart NIC, a field programmable gate array (FPGA), a GPU, a storage controller, a PCIe retime card, or a storage device. In another implementation, the device is compliant with an Open Computing Projection (OCP) 3.0 Specification. In another implementation, the input/output control circuit includes a non-volatile memory storing a bifurcation setting to generate the bifurcation control signal. In another implementation, the input/output circuit includes a microcontroller. In another implementation, the input/output circuit includes a complex programmable logic device. In another implementation, the input/output circuit includes an input/output controller.

Another disclosed example is a method of providing a bifurcation control signal to a device having a bus bifurcation function. A bifurcation setting is stored in a non-volatile memory. An input/output circuit coupled to the device is powered on. A bifurcation control signal is provided from the input/output circuit to the device prior to an auxiliary power transition period during a power on routine of the device. The control signal is based on the stored bifurcation setting.

In another implementation of the example method, the bifurcation control signal, when received by the device, activates the bus bifurcation function of the device. In another implementation, an updated bifurcation setting is provided via a bus coupled between a baseboard management controller and the input/output circuit. In another implementation, the bifurcation control signal is usable to activate a bus bifurcation function of a host interface coupled to the device. In another implementation, the bifurcation control signal is provided to a platform controller hub to activate the bus bifurcation function of the host interface. In another implementation, the device is selected from the group consisting of a network interface card (NIC), a smart NIC, a field programmable gate array (FPGA), a GPU, a storage controller, a PCIe retime card, or a storage device. In another implementation. the input/output circuit includes one of a microcontroller, a complex programmable logic device, or an input/output controller.

Another disclosed example is a server having a device with a bus bifurcation function with an input to activate the bus bifurcation function. An input/output control circuit has an output coupled to a bifurcation control line coupled to the device. The input/output control circuit is operable to provide a bifurcation control signal to the device over the bifurcation control line during an auxiliary power phase transition period of powering-on the device. The server includes a baseboard management controller and a bus coupling the baseboard management controller to the input/output control circuit. The baseboard management controller is operable to update the bifurcation control signal provided by the input/output control circuit after the auxiliary power phase transition period. The server includes a platform controller hub having an input coupled to the bifurcation control line.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1:
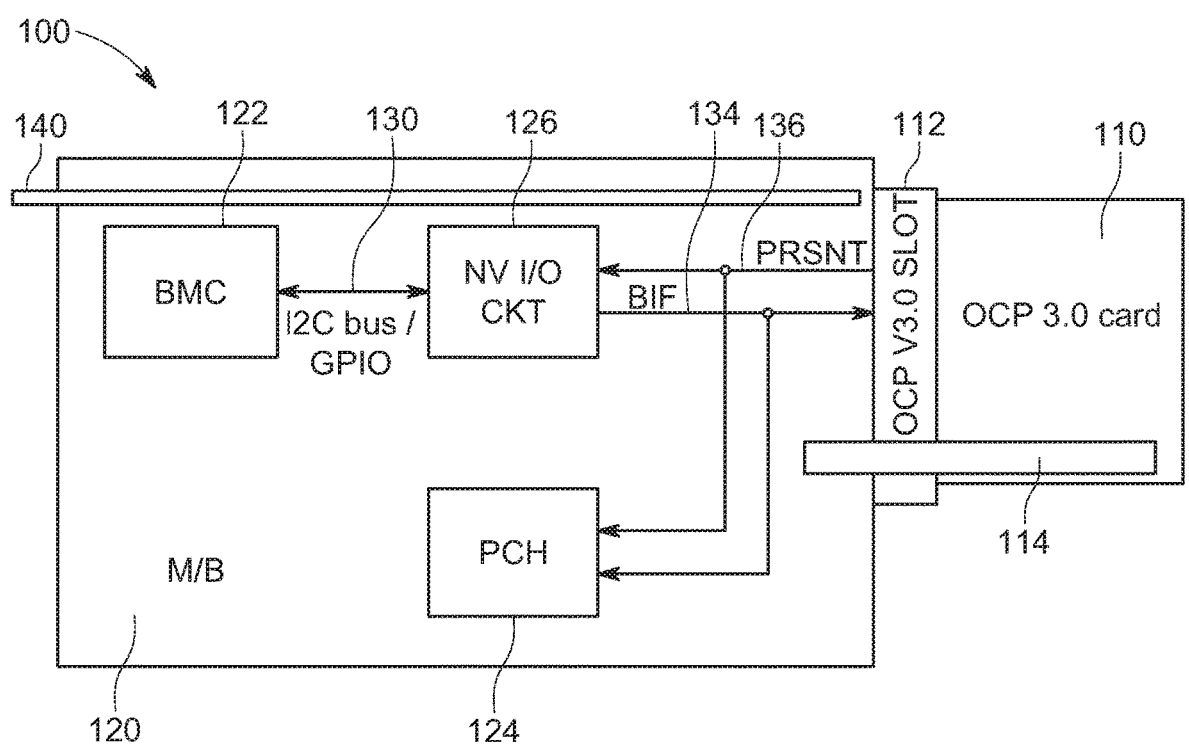
FIG. 1 is a block diagram of a control circuit that allows the bifurcation control of an OCP device during the power-on sequence, according to certain aspects of the present disclosure.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure provides an input/output circuit that is interposed between a BMC and a PHC to provide signals for bifurcation control during the power-on sequence for an OCP 3.0 device. The input/output circuit includes a non-volatile memory that provides a bifurcation control output signal to the OCP 3.0 device during the initial period of the power start up sequence. Thus, the bifurcation control signal is provided independently of the BMC or PCH thereby allowing for the bifurcation control feature to be activated during the auxiliary power transition period of the power on sequence of the OCP 3.0 device.

FIG. 1 is a block diagram of a computer system 100 that includes an OCP 3.0 device 110. In this example, the computer system 100 may be a server suitable for use in a data center or in other network based applications. In this example, the OCP 3.0 device 110 may be any suitable PCIe compliant device such as a network interface card (NIC), a smart NIC, a storage card, a field programmable gate array (FPGA), a GPU, a storage controller, a PCIe retime card, or any other OCP 3.0 compliant device. The OCP 3.0 device 110 is installed in an OCP 3.0 slot 112 that is part of a motherboard 120. The OCP 3.0 device 110 may provide an interface to an internal PCIe bus 114 with multiple channels. The OCP 3.0 device 110 therefore provides additional functionality to the computer system 100 and allows for bifurcation of the PCIe bus 114.

The motherboard 120 includes a BMC 122, a PCH 124, and a non-volatile input/output circuit 126. The BMC 122 is coupled to the circuit 126 via an I2C bus 130. The I2C bus 130 includes a line that provides signals from a GPIO on the BMC 122 for providing a bifurcation override control signal to the circuit 126. In this example, the BMC 122 may provide a dynamic setting to configure the PCIe bus bifurcation after the power-on sequence.

The input/output circuit 126 includes a bifurcation signal output that is coupled to a bifurcation (BIF) line 134 that supplies a bifurcation control signal to the OCP 3.0 device 110 via the slot 112. The PCH 124 may detect the bifurcation control signal setting the bifurcation mode from the input/output signal 126 via the BIF line 134. The input/output circuit 126 includes an input coupled to an input present line 136. The input present line 136 provides an input present signal from the OCP 3.0 device 110 indicating presence of and information about the bifurcation capability of OCP 3.0 device 110. This information may include the correct mapping to use for the OCP socket for the particular device such as the OCP 3.0 device 110. The input present signal is sent to the input/output circuit 126. The PCH 124 receives the input present signal from the OCP 3.0 device 110 via the input present line 136. The PCH 124 may use the input present signal to keep a record of the bifurcation capabilities of the attached OCP 3.0 device 110. The PCH 124 also receives the bifurcation control signal from the BIF line 134. A standby power pin 140 supplies standby power to the components on the motherboard 120.

In this example, the BMC 122 includes a non-volatile memory that stores a dynamic setting to provide a control signal configure the bifurcation of the PCIe bus 114 of the OCP 3.0 device 110. The input/output circuit 126 provides the control signal during the first phase of the power-on of the OCP 3.0 device 110. Therefore, the OCP 3.0 device 110 enables the bifurcation function during the power-on routine according to the OCP 3.0 Specification.

Figure 2:
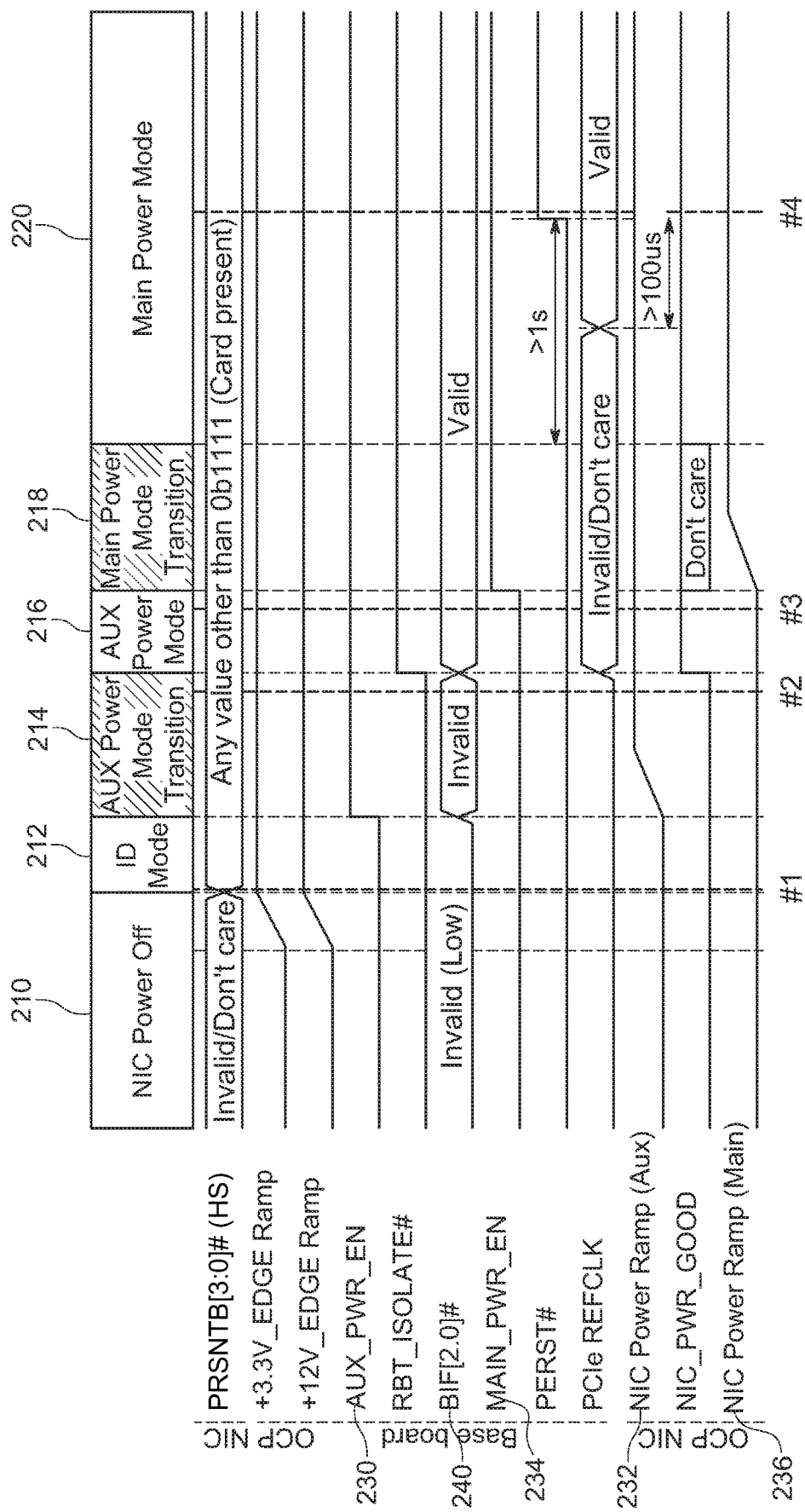
FIG. 2 is a timing diagram of the power-on sequence for an OCP 3.0 device.

FIG. 2 is a timing diagram 200 of the power-on sequence of an example OCP 3.0 device such as a network interface card. The timing diagram 200 includes a OCP device power off period 210, an ID mode period 212, an auxiliary power mode transition period 214, an auxiliary power mode period 216, a main power mode transition period 218, and a main power mode period 220. The power-on sequence is activated by an auxiliary power enable signal (AUX_PWR_EN) 230 that is activated at the beginning of the auxiliary power mode transition period 216. This allows for an auxiliary power signal 232 to begin ramping up. The auxiliary power mode period 216 begins when the auxiliary power signal 232 is ramped up to the auxiliary power level. A main power enable signal 234 is activated at the beginning of the main power mode transition period 218. The main power enable signal 234 allows for a main power signal 236 to begin ramping up. The main power mode period 220 begins when the main power signal 236 is fully ramped up. A bifurcation control signal (BIF[2:0]#) 240 may be validly activated during the auxiliary mode period 216 to activate the bifurcation mode. In this sequence of time periods 210, 212, 214, 216, 218, and 220 in the power-on sequence, the bifurcation control signal 240 for the OCP 3.0 device 110 is activated by the control circuit 126 (both in FIG. 1) during the ID mode period 212.

The recommendation of the OCP 3.0 Specification is to user either the BMC 122 or the PCH 124 for the bifurcation control signal to the OCP device 110. As shown in FIG. 2, the OCP 3.0 Specification requires completion of the bifurcation setting after the auxiliary power mode transition 214. The general purpose input/output (GPIO) pin for bifurcation control signals from the PCH 124 are only ready in the main power mode period 220. The GPIO pins for outputting a bifurcation control signal from the BMC 122 (in FIG. 1) allows for control of the bifurcation setting of the OCP device 110 during the auxiliary power mode transition period 214 to the auxiliary power mode period 216. However, the BMC 122 will take 5-10 minutes for a firmware boot in a normal case, and thus the signal cannot be sent to the OCP device 110 during the transition period 214.

The non-volatile input/output control circuit 126 includes a memory to store a bifurcation setting that may be directly connected to the bifurcation signal input of the OCP device 110. The control circuit 126 outputs the set bifurcation control signal to the OCP 3.0 device 110 via the BIF line 134 during the ID Mode period 212 in FIG. 2. The bifurcation control signal transmitted by the input/output control circuit 126 meets the timing sequence of the OCP 3.0 Specification shown in FIG. 2 by holding the bifurcation signal through the required auxiliary power mode transition period 214. The provision of this signal avoids any timing issue for dynamic bifurcation control from either the BMC 122 or the PCH 124 (in FIG. 1) and has no side effects.

Figure 3:
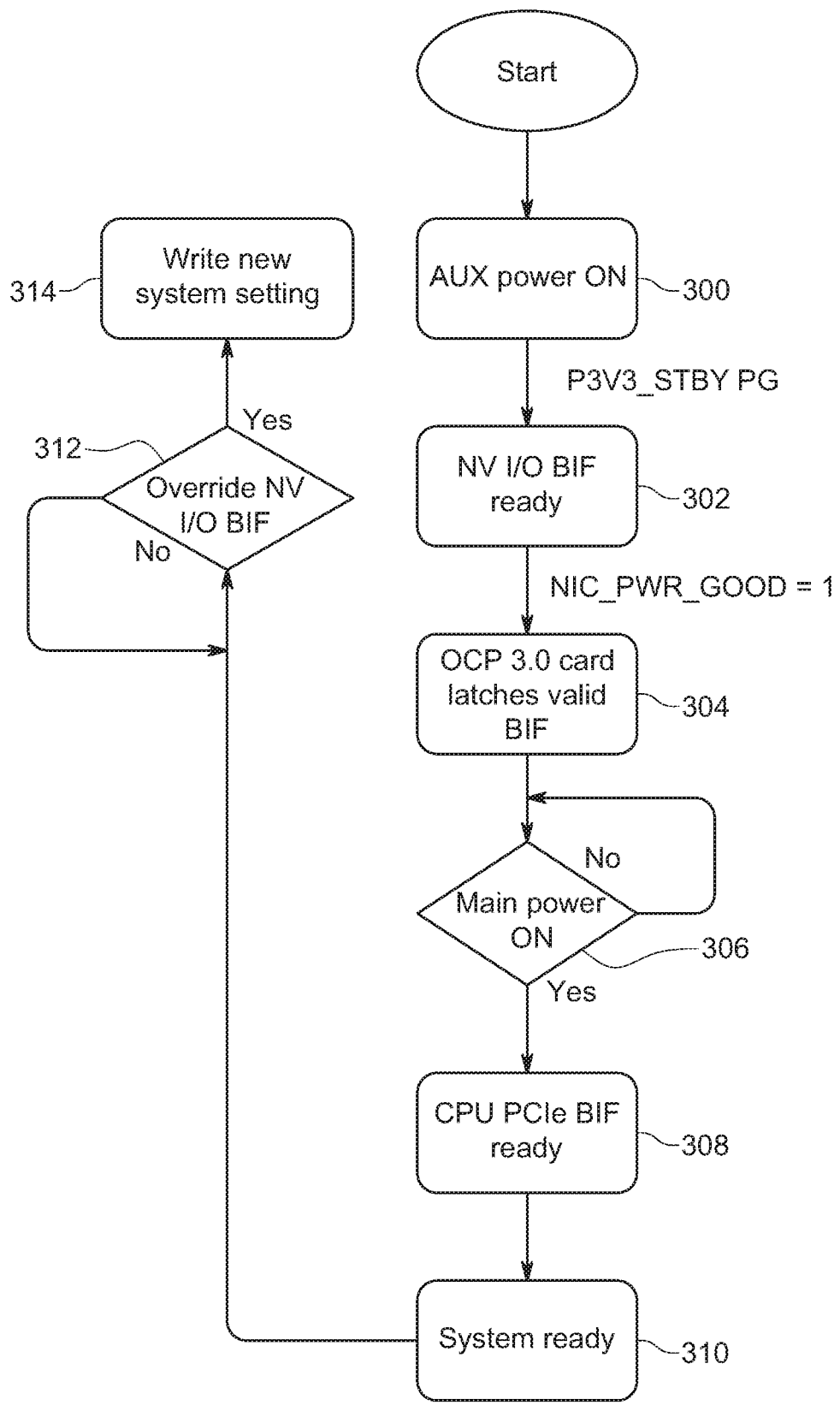
FIG. 3 is a flow diagram of a routine that provides an alternative bifurcation control signal to an OCP device during the power-on sequence, according to certain aspects of the present disclosure.

FIG. 3 is a flow diagram of a routine for OCP 3.0 dynamic bifurcation executed by the control circuit 126 in the system 100 in FIG. 1 to avoid timing issues from the BMC 122 and the PCH 124. The routine in FIG. 3 to overrides the need for a bifurcation setting initiated a remote BMC command by flexibly reconfiguring the OCP device 110 by the input/output circuit 126. The flow diagram in FIG. 3 is representative of example machine readable instructions for the process of dynamic bifurcation configuration of the OCP device 110 in FIG. 1. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC]; a programmable logic device [PLD]; a field programmable logic device [FPLD]; a field programmable gate array [FPGA]; discrete logic; etc.). For example, any or all of the components of the interfaces can be implemented by software, hardware, and/or firmware. Also, some or all of the machine readable instructions represented by the flowcharts may be implemented manually. Further, although the example algorithm is described with reference to the flowchart illustrated in FIG. 3, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The routine first determines that the auxiliary power mode is turned on for an OCP device such as the OCP device 110 in FIG. 1 (300). In this example, the standby power pin 140 (P3V3_STBY PG) of the system 100 in FIG. 1 is turned on to begin the power-on sequence shown in FIG. 2 for the OCP device 110, and provide power to the input/output circuit 126. The bifurcation line 134 coupled to the input/output circuit 126 is made ready (302). The OCP device 110 latches a valid bifurcation control input based on the bifurcation control signal sent by the input/output circuit 126 on the bifurcation line 134 (304). The control signal activates the bus bifurcation function on the OCP device 110 during the auxiliary power transition period 214 in FIG. 2.

The routine then monitors whether the main power to the OCP device 110 has been activated in the power-on sequence (306). If the main power mode period 220 in FIG. 2 has not been activated, the routine continues to monitor whether the main power mode has been activated (306). If the main power mode has been activated, the system host activates the bifurcation mode (308). The routine then indicates that the bifurcation mode of the OCP 3.0 device 110 is ready (310).

The routine then determines whether the bifurcation signal from the input/output circuit 126 on the bifurcation line 134 should be overridden by a command received from the BMC 122 (312). If there is no override command from the BMC 122, the routine continues to check whether the signal of the bifurcation line 134 should be overridden. If there is an override command from the BMC 122 to override the signal, the routine will write the new system setting to the memory of the input/output circuit 126 (314). The next time the system is power cycled, the updated system setting will be read from the input/output circuit 126.

Figure 4A:
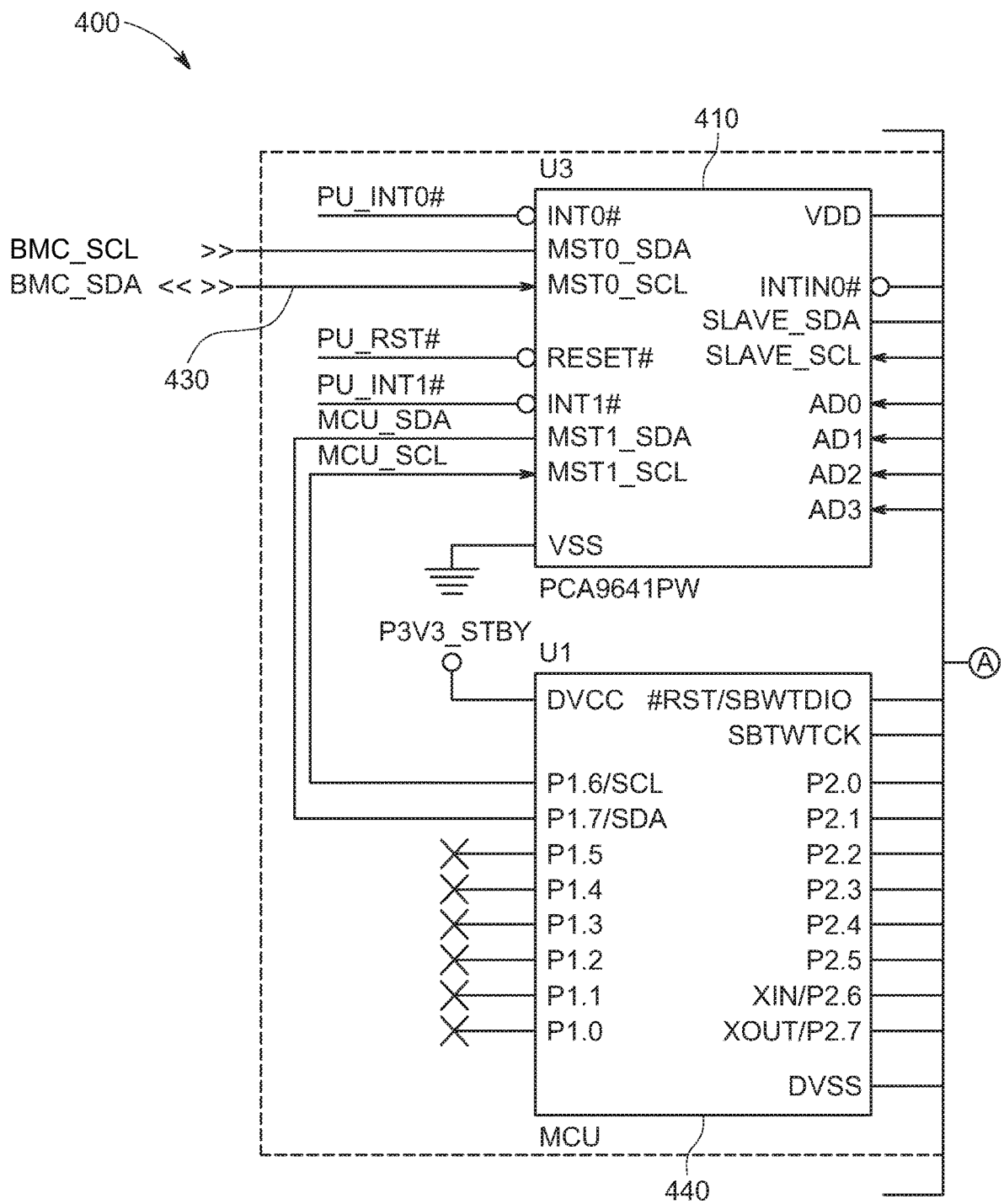
FIGS. 4A-4B is a block diagram of one configuration of the input/output control circuit in FIG. 1, including a microcontroller and an EEPROM, according to certain aspects of the present disclosure.
Figure 4B:
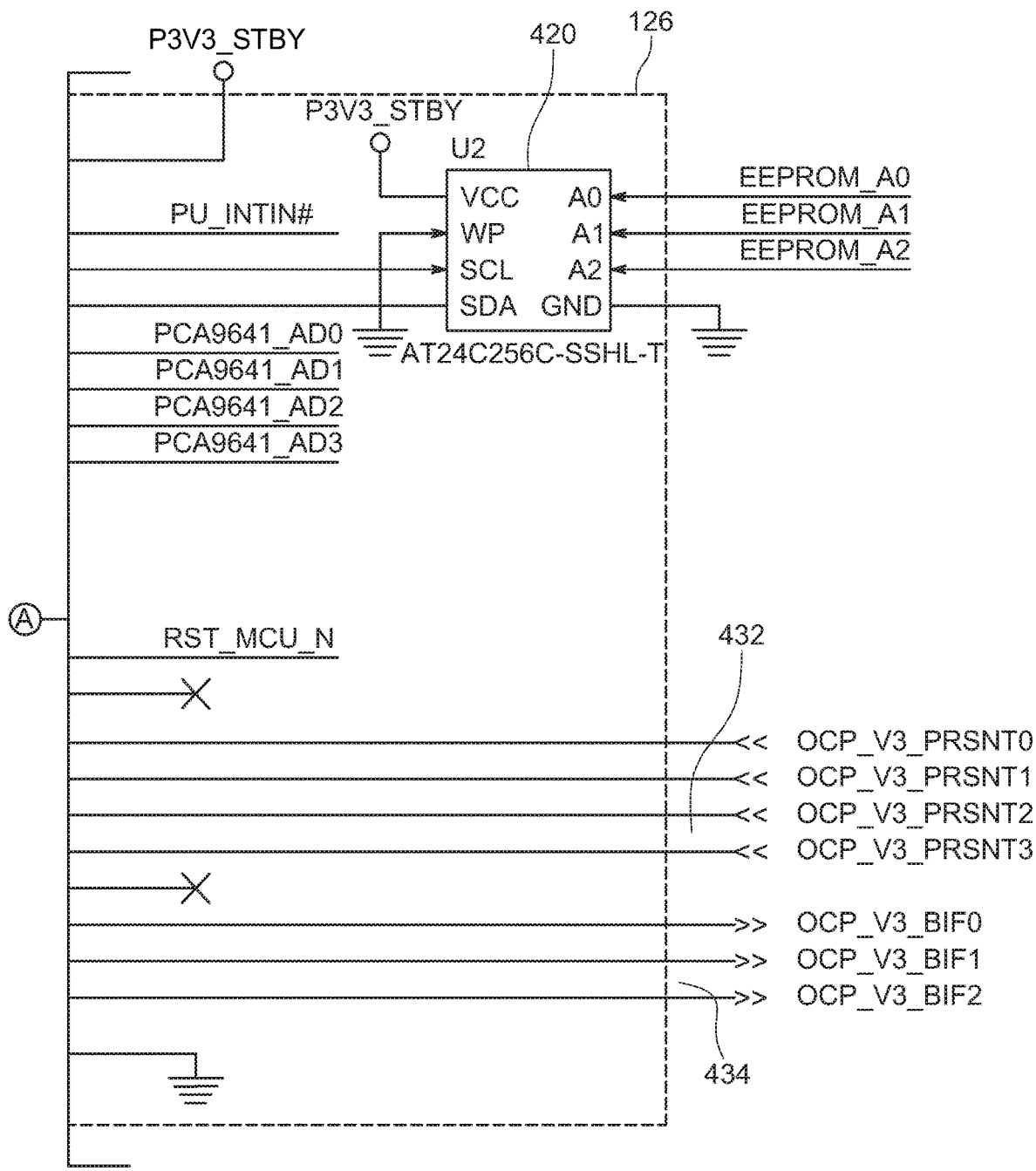

FIGS. 4A-4B show one possible configuration of the input/output circuit 126 in FIG. 1. FIGS. 4A-4B show a block diagram of a configuration 400 of a micro controller unit (MCU) or microcontroller 410 in combination with an electronically erasable programmable ROM (EEPROM) 420. Alternatively, the memory may be a SPI flash memory device. The configuration 400 includes input lines 430 from the BMC 122 that are controlled by a I2C bus controller 440. The bus controller 440 also is coupled to input lines 432 from the OCP device 110, and output lines 434 to the OCP device 110. In this example, the EEPROM 420 stores the bifurcation control signal that is sent to the OCP device 110 over the output lines 434.

Figure 5:
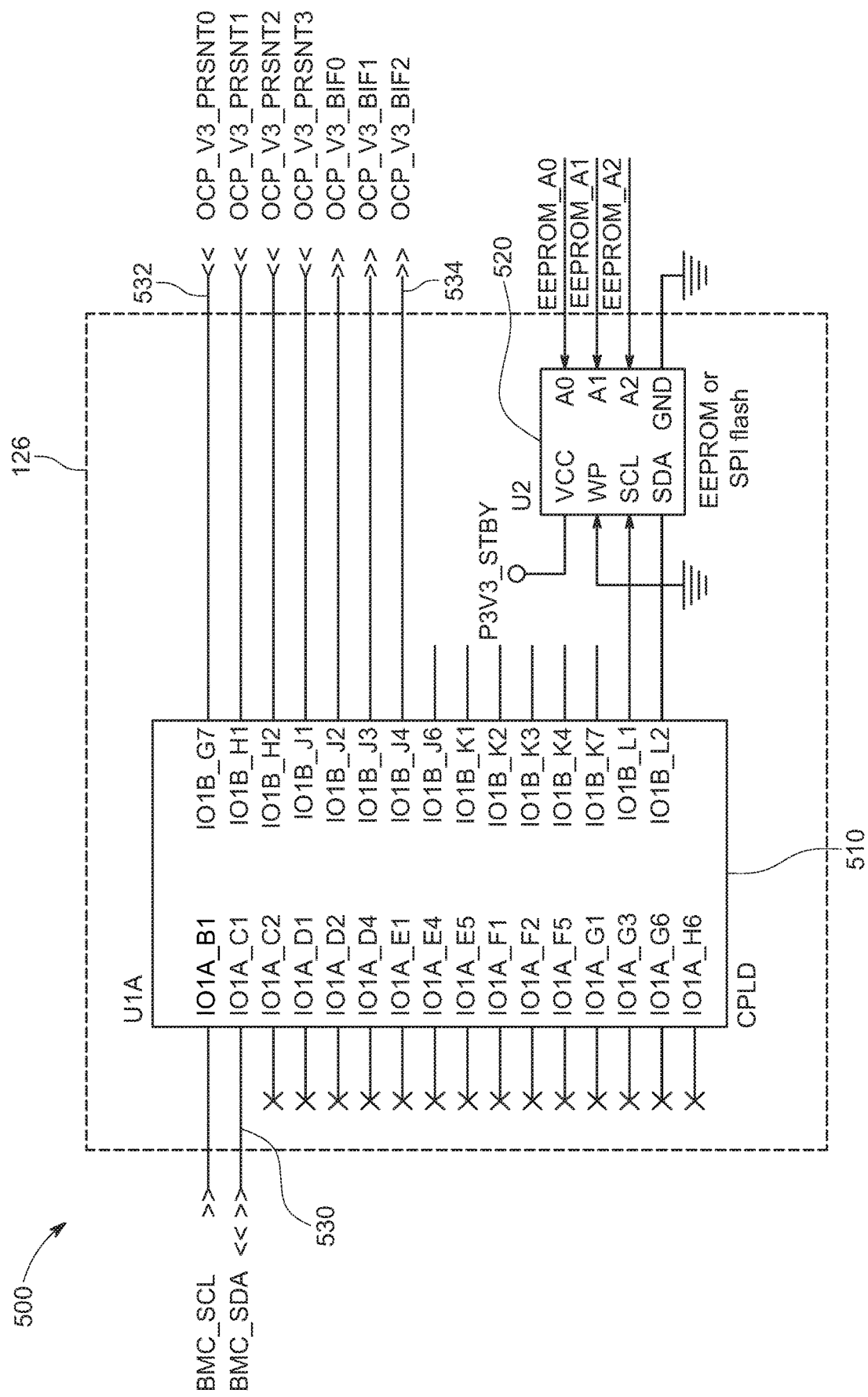
FIG. 5 is a block diagram of another configuration of the input/output control circuit in FIG. 1, including a CPLD and an EEPROM, according to certain aspects of the present disclosure.

FIG. 5 is a block diagram of another configuration 500 of the input/output control circuit 126 in FIG. 1, including a complex programmable logic device (CPLD) 510 and an EEPROM 520. The configuration 500 includes input lines 530 from the BMC 122; input lines 532 from the OCP device 110; and output lines 534 to the OCP device 110. In this example, the EEPROM 510 stores the bifurcation control signal that is sent to the OCP device 110 over the output lines 434.

Figure 6:
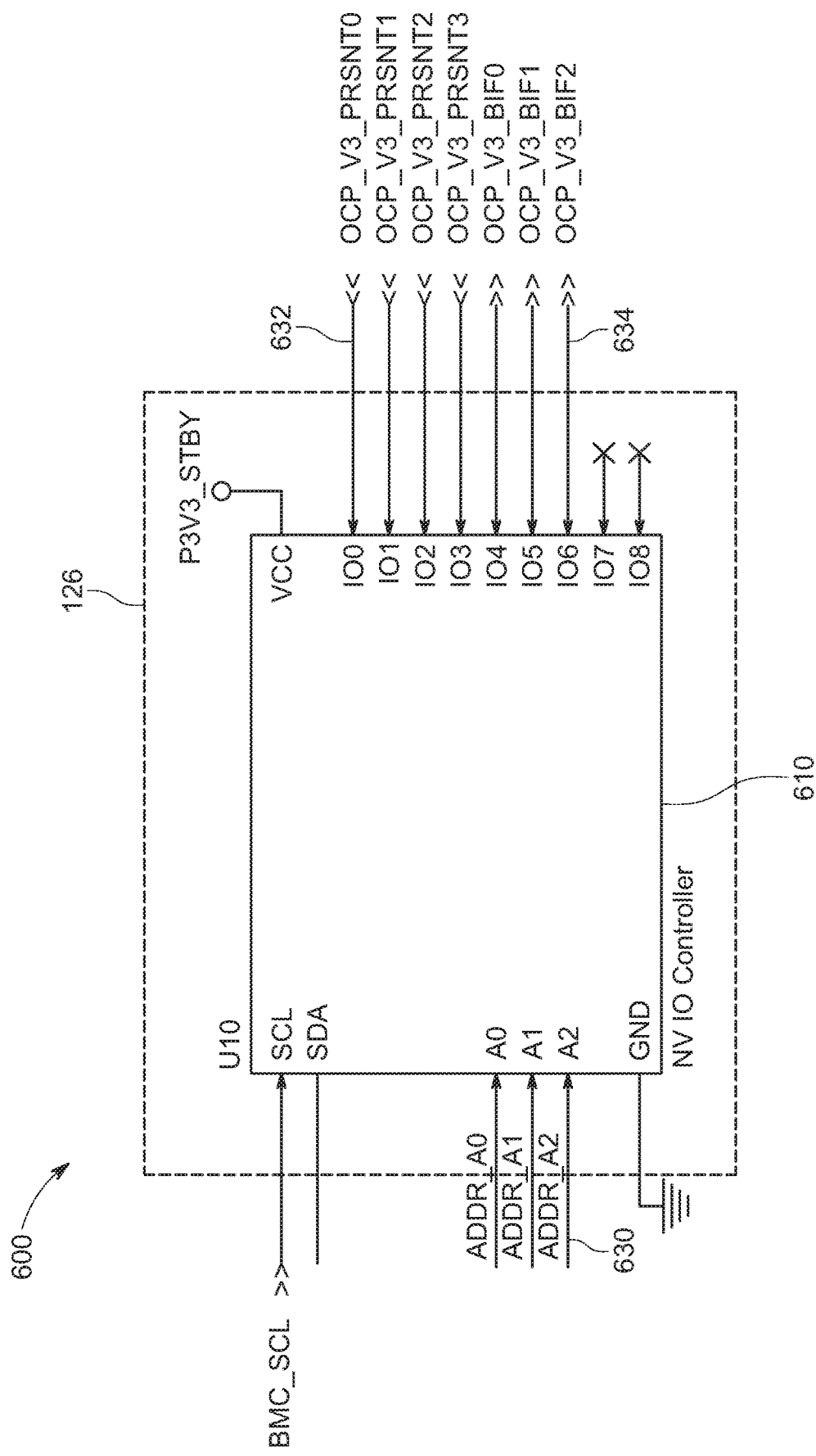
FIG. 6 is a block diagram of another configuration of the input/output control circuit in FIG. 1, including a non-volatile input/output controller, according to certain aspects of the present disclosure.

FIG. 6 is a block diagram of another configuration 600 of the input/output control circuit 126 in FIG. 1, including a non-volatile input/output controller 610. The controller 610 is an input/output expander circuit that includes an internal non-volatile storage device. The configuration 600 includes input lines 630 from the BMC 122; input lines 632 from the OCP device 110; and output lines 634 to the OCP device 110.

Figure 7:
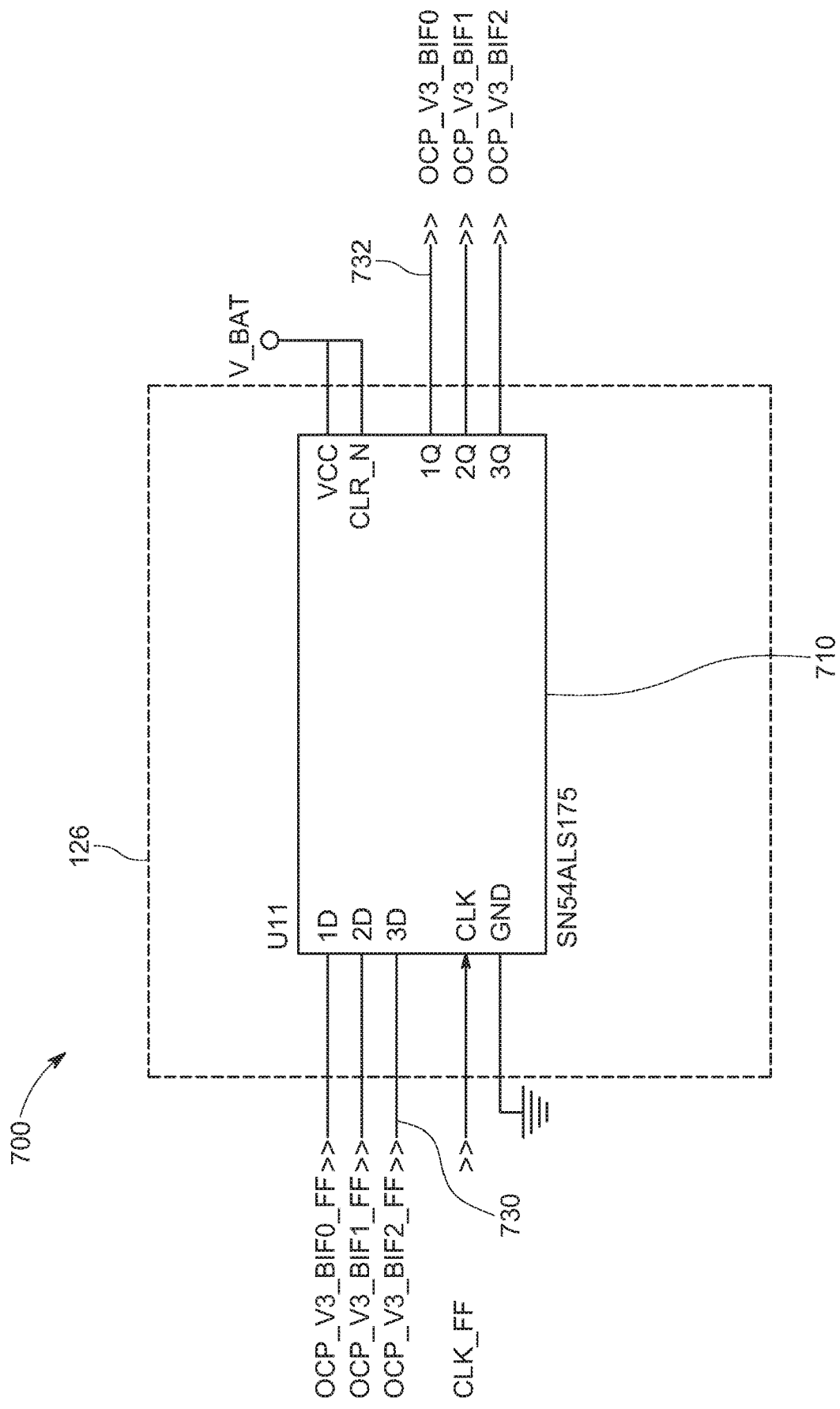
FIG. 7 is a block diagram of another configuration of the input/output control circuit in FIG. 1, including a GPIO latched circuit, according to certain aspects of the present disclosure.

FIG. 7 is a block diagram of another configuration 700 of the input/output control circuit 126 in FIG. 1 including a GPIO latch circuit 710. The latch circuit 710 may be a D-flip flop or any suitable latch that can store a signal. In this example, the latch circuit 710 has an independent power source such as a battery. The configuration 700 includes input lines 730 from the BMC 122, and output lines 732 to the OCP device 110, for the bifurcation control signal.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A system for generating a bifurcation control signal, the system comprising:
a device having a bus bifurcation function with an input to activate the bus bifurcation function;
a baseboard management controller coupled to the device, the baseboard management controller performing a firmware boot, wherein the baseboard management controller cannot send a bifurcation control signal to the device while performing the firmware boot; and
an input/output control circuit having an output coupled to a bifurcation control line coupled to the device, wherein the input/output control circuit is operable to provide a bifurcation control signal to the device over the bifurcation control line to activate the bus bifurcation function during an auxiliary power phase transition period of powering on the device while the baseboard management controller is performing the firmware boot.

2. The system of claim 1, further comprising:
a bus coupling the baseboard management controller to the input/output control circuit, wherein the baseboard management controller is operable to update the bifurcation control signal provided by the input/output control circuit after the auxiliary power phase transition period.

3. The system of claim 1, further comprising a platform controller hub having an input coupled to the bifurcation control line.

4. The system of claim 1, wherein the device is selected from the group consisting of a network interface card (NIC), a smart NIC, a field programmable gate array (FPGA), a GPU, a storage controller, a PCIe retime card, or a storage device.

5. The system of claim 1, wherein the device is compliant with an Open Compute Project (OCP) 3.0 Specification.

6. The system of claim 1, wherein the input/output control circuit includes a non-volatile memory storing a bifurcation setting to generate the bifurcation control signal.

7. The system of claim 6, wherein the input/output circuit includes a microcontroller.

8. The system of claim 6, wherein the input/output circuit includes a complex programmable logic device.

9. The system of claim 1, wherein the input/output circuit includes an input/output controller.

10. A method of providing a bifurcation control signal to a device to activate a bus bifurcation function, the method comprising:
    storing a bifurcation setting in a non-volatile memory;
    performing a firmware boot for a baseboard management controller coupled to the device, wherein the baseboard management controller cannot send a bifurcation control signal to the device while performing the firmware boot;
    powering on an input/output circuit coupled to the device; and
    providing a bifurcation control signal from the input/output circuit to the device prior to an auxiliary power transition period during a power-on routine of the device and while the baseboard management controller is performing the firmware boot, wherein the control signal is based on the stored bifurcation setting.

11. The method of claim 10 wherein the bifurcation control signal, when received by the device, activates the bus bifurcation function of the device.

12. The method of claim 10, further comprising providing an updated bifurcation setting via a bus coupled between the baseboard management controller and the input/output circuit.

13. The method of claim 10, wherein the bifurcation control signal is usable to activate a bus bifurcation function of a host interface coupled to the device.

14. The method of claim 13, further comprising providing the bifurcation control signal to a platform controller hub to activate the bus bifurcation function of the host interface.

15. The method of claim 10, wherein the device is selected from the group consisting of a network interface card (NIC), a smart NIC, a field programmable gate array (FPGA), a GPU, a storage controller, a PCIe retime card, or a storage device.

16. The method of claim 10, wherein the input/output circuit includes one of a microcontroller, a complex programmable logic device, or an input/output controller.

17. A server comprising:
    a device having a bus bifurcation function with an input to activate the bus bifurcation function;
    a baseboard management controller coupled to the device, the baseboard management controller performing a firmware boot, wherein the baseboard management controller cannot send a bifurcation control signal to the device while performing the firmware boot;
    an input/output control circuit having an output coupled to a bifurcation control line coupled to the device, wherein the input/output control circuit is operable to provide a bifurcation control signal to the device over the bifurcation control line during an auxiliary power phase transition period of powering on the device while the baseboard management controller is performing the firmware boot;
    a bus coupling the baseboard management controller to the input/output control circuit, wherein the baseboard management controller is operable to update the bifurcation control signal provided by the input/output control circuit after the auxiliary power phase transition period; and
    a platform controller hub having an input coupled to the bifurcation control line.

18. The server of claim 17, wherein the device is selected from the group consisting of a network interface card (NIC), a smart NIC, a field programmable gate array (FPGA), a GPU, a storage controller, a PCIe retime card, or a storage device.

19. The server of claim 17, wherein the device is compliant with an Open Compute Project (OCP) 3.0 Specification.

20. The server of claim 17, wherein the input/output circuit includes one of a microcontroller, a complex programmable logic device, or an input/output controller.

* * * * *